(12) United States Patent
Smith et al.

(10) Patent No.: US 8,259,925 B2
(45) Date of Patent: Sep. 4, 2012

(54) SERVICE WAIT TIME NOTIFICATION

(75) Inventors: Sandra Smith, Plantation, FL (US);
Julie Goodwin, Boca Raton, FL (US);
Barbara Stemmer, Boca Raton, FL (US); Nigel Smith, Deerfield Beach, FL (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1174 days.

(21) Appl. No.: 12/080,540

(22) Filed: Apr. 3, 2008

(65) Prior Publication Data

US 2009/0252318 A1    Oct. 8, 2009

(51) Int. Cl.
*H04M 3/00* (2006.01)
*H04M 5/00* (2006.01)

(52) U.S. Cl. .................. 379/266.06; 379/265.1
(58) Field of Classification Search ............ 379/266.06, 379/265.02, 265.1, 266.01; 705/304; 709/227
See application file for complete search history.

(56) References Cited

U.S. PATENT DOCUMENTS

| | | | | |
|---|---|---|---|---|
| 2003/0061354 | A1* | 3/2003 | Burg et al. | 709/227 |
| 2010/0077082 | A1* | 3/2010 | Hession et al. | 709/227 |

* cited by examiner

*Primary Examiner* — Khai N Nguyen (57) ABSTRACT

A system for communicating service information to a potential customer is provided. The system includes one or more potential customer devices, one or more session initiation protocol (SIP) client devices, and a SIP server. The SIP server is operable to determine an estimated service wait time based on information received from the one or more SIP client device and communicate the estimated wait time to the one or more potential customer devices.

26 Claims, 5 Drawing Sheets

SERVICE WAIT TIME NOTIFICATION

BACKGROUND

The present embodiments relate to service wait time notification.

A service-related enterprise provides service to customers. The enterprise may be a restaurant, entertainment attraction, theme park, business, office, department, hair salon, clothing store, theater, or other service related organization. A customer may be required to wait a length of time before being served at the enterprise because of service related restraints, such as capacity, time, or limited assistance.

Customers want to know estimated wait times because the length of the wait may cause a potential customer to choose a different service enterprise or choose a different time to attend the enterprise. For example, a customer wanting to eat dinner may choose a restaurant based on the length of wait before being seated or receiving a meal. In an amusement park, customers have the option to select from different entertainment attractions. The customer may select an entertainment attraction based on the wait time before being able to ride the entertainment attraction.

Notification of an estimated wait time at a service enterprise is generally limited to direct contact with the service enterprise. To determine the estimated wait time before being served, a customer contacts the service enterprise and speaks with a representative, who estimates the wait time. The customer may also arrive at the service enterprise and estimates the wait time themselves. In either case, someone must be present at the enterprise and be willing to provide the estimated wait time. The amount of information about the estimated wait time is limited to the information available to the person making the estimation.

SUMMARY

The present embodiments relate to communicating service information, such as an estimated wait time for service, to a potential customer using a session initiation protocol (SIP) system. The SIP system may be used to collect information about the wait time at the enterprise and estimate a service wait time at the enterprise based on the collected information. The estimated wait time is then communicated to potential clients having access to potential client devices.

In a first aspect, a method for communicating service information to a potential customer is provided. The method includes transmitting information from a session initiation protocol (SIP) client to a SIP server, determining an estimated wait time using the SIP server as a function of the wait time information from the SIP client, and transmitting the estimated wait time from the SIP server to a customer device.

In a second aspect, a system for communicating service information to a potential customer is provided. The system includes one or more potential customer devices; one or more session initiation protocol (SIP) client devices; and a SIP server. The SIP server is operable to determine an estimated service wait time based on information received from the one or more SIP client devices and communicates the estimated wait time to the one or more potential customer devices.

In a third aspect, computer readable storage media including instructions for communicating service information to a potential customer is provided. The instructions are for receiving information about actual wait times from one or more SIP client devices; estimating an amount of time before a potential customer is served as a function of the actual wait times; transferring the estimated amount of time to a customer device.

DETAILED DESCRIPTION

The present embodiments relate to session initiation protocol (SIP) signaling for collecting and distributing service wait time information from/to SIP-aware client devices. An SIP system may include a SIP server and SIP client device. A method is provided that uses SIP signaling to notify the SIP server of performance measurements related to service wait times and/or to transmit service wait times to a user from the SIP server.

Figure 1:
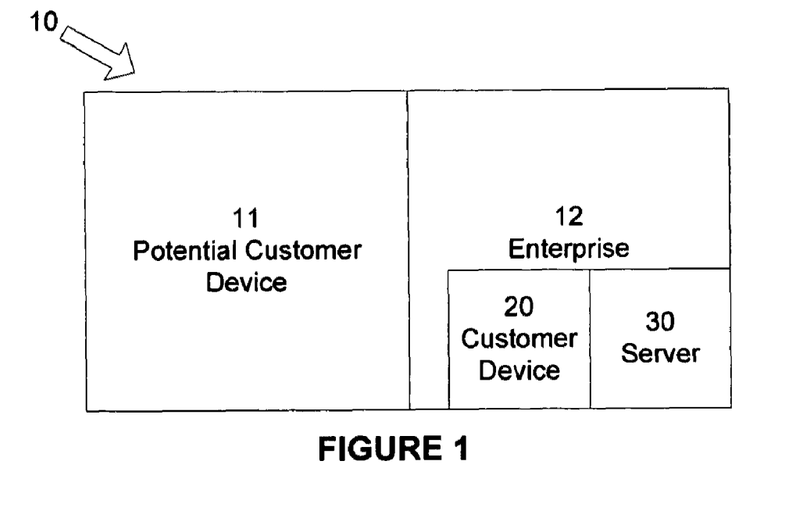
FIG. 1 illustrates one embodiment of a system for communicating service information to a potential customer.

FIG. 1 shows a system 10 for communicating service information to a potential customer. The system 10 may include a potential customer device 11 and an enterprise 12. Additional, different, or fewer components may be provided. For example, the system 10 may include multiple enterprises 12 and/or multiple potential customer devices 11. The system 10 is a network, telecommunication system, session initiation protocol (SIP) system, application-layer control (signaling) system, Internet system, intranet system, other now known or later developed communication system, or any combination thereof. In one example, the system 10 includes a SIP system that communicates with a potential or actual customer using an Internet system. In another example, the system 10 is a network of SIP systems that provide information, which relates to the enterprise 12, to customers via a communication system.

The potential customer device 11 is a SIP client, SIP endpoint, SMS device, VoIP device, Internet browser, intranet browser, WEB browser, remote terminal device, telecommunication device, handheld device, portable electronic device, personal computer, display device, a combination thereof, or any other now known or later developed device for communicating information to a potential customer. For example, the potential customer device 11 may be a WEB browser operable to access and browse the Internet. The potential customer device 11 may be used to view the enterprise's web-site. In another example, the potential customer device 11 is a SIP endpoint, which is operable to communicate with a SIP server or within a SIP system. The SIP endpoint may be used to establish a session with the SIP server and transmit communication data to and/or receive communication data from the server. In another example, the potential customer device 11 is a telecommunication device, such as a cellular telephone device, which may operate to access enterprise information via telecommunication. The potential customer device 11 will be discussed in more detail below, with respect to the examples shown in FIGS. 4-6.

Figure 2:
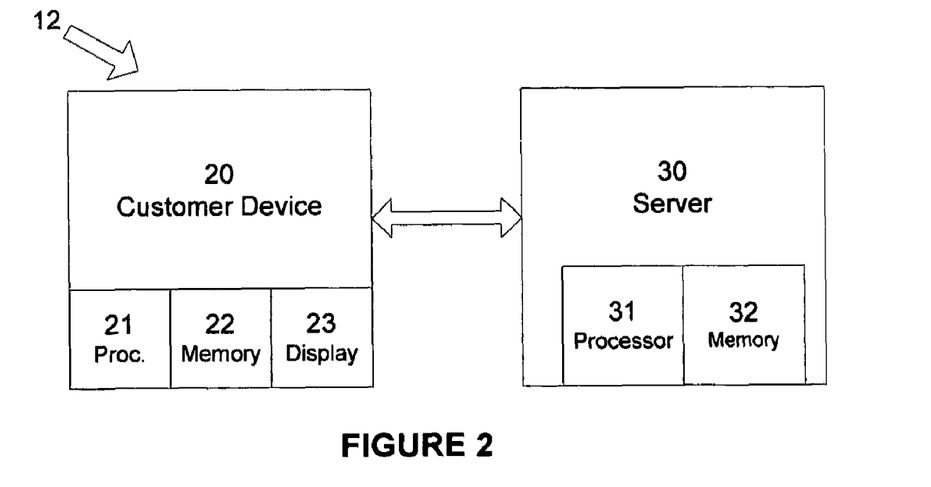
FIG. 2 illustrates one embodiment of a communication system.

As shown in FIG. 2, the enterprise 12 may include a customer device 20 and a server 30. Additional, different, or fewer components may be provided. For example, the enterprise 12 may include multiple customer devices 20 and/or servers 30. The enterprise 12 is a business, company, restaurant, theme park, amusement ride at a theme park, office, department, salon, golf course, car rental agency, or any other now known or later established organization. The enterprise 12 is a service or product oriented organization. A customer, who is to be served at the enterprise 12, may have to wait before being served. The length of time from when the customer begins to wait until the customer is served is the actual wait time. The actual wait time may be estimated before the customer begins to wait, this estimated time is the estimated wait time. Alternatively, the wait time is estimated after the customer begins to wait, and/or the wait time until a milestone or event is estimated rather than an actual time.

Figure 3:
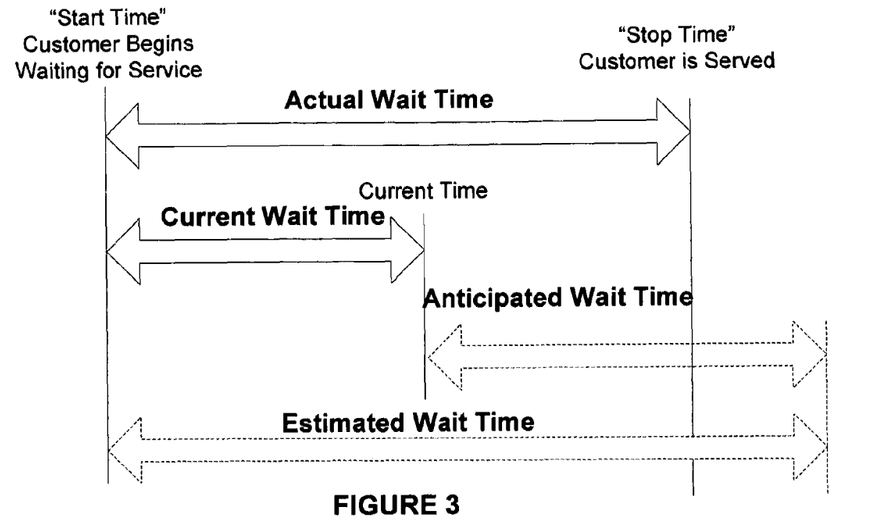
FIG. 3 illustrates one embodiment of different service wait times.

The enterprise 12 may provide automated assistance for determining service wait times, such as the actual wait time, current wait time, anticipated wait time, and estimated wait time. As shown in FIG. 3, the actual wait time is the amount of time a customer actually waits before being served. The current wait time is the length of time that the customer has been waiting since receiving the customer device 20. The anticipated wait time is the estimated amount of time remaining before the customer is to be served. The estimated wait time is the estimated amount of time that a customer will have to wait before being served. The estimated wait time may or may not be equivalent to the actual wait time. For example, the enterprise 12 may be a restaurant where customers generally wait before being seated for and/or receiving a meal. As shown in FIG. 3, the estimated wait time may be longer than the actual wait time. Alternatively, the estimated wait time may be shorter than the actual wait time.

The customer device 20 may include a processor 21, memory 22, and display 23, as shown in FIG. 2. Additional, different, or fewer components may be provided, such as a transmitting device for communication with the server 30, one or more customer devices 20, and/or other communication devices. The customer device 20 is an SIP endpoint device, SIP client device, network device, telecommunication device, terminating endpoint, communication device, or other now known or later developed notification or signaling device. For example, the customer device 20 is an SIP endpoint device that receives signals from and/or transmits signals to the server 30. The SIP endpoint device may also use SIP signaling to communicate with other devices within the SIP system.

The processors 21 and 31 are general processors, digital signal processors, application specific integrated circuits, field programmable gate arrays, analog circuit, digital circuit, combinations thereof, or other now known or later developed processors. The processors 21 and 31 may be single devices or combinations of devices, such as associated with a network or distributed processing. Any of various processing strategies may be used, such as multi-processing, multi-tasking, parallel processing, or the like. The processors 21 and 31 are responsive to instructions stored as part of software, hardware, integrated circuits, firmware, micro-code or the like.

The processor 21 operates to receive data from and/or transmit data to the server 30, other customer devices 20, other communication devices, or a combination thereof. The processor 21 may transmit and/or receive activation signals, termination signals, request signals, or performance measurement signals. Any information, relating to or not relating to service wait time, may be received from and/or transmitted to the processor 21.

In one embodiment, a SIP protocol may be used to transmit communications to and/or from the server 30. For example, customer device 20 or potential customer device 11 may communicate with the server 30 using an SIP protocol. The SIP protocol may be used to transport Extensible Markup Language (XML) documents within the body of a NOTIFY or PUBLISH request using standard SIP signaling. For example, the processor 21 may communicate with the server 30 passing an XML document for the server 30 or customer device 20. The document may relate to stored information, signals, or other relevant communication data.

The SIP protocol may be used to communicate service information using SIP Requests and SIP Responses. SIP Requests are the messages used by SIP for communication. For example, SIP Requests may include SUBSCRIBE, NOTIFY, and PUBLISH request. A SUBSCRIBE request may subscribe for an Event of Notification from the notifier, such as the Server 30. A NOTIFY request may notify the subscriber of a new Event. A PUBLISH request publishes an event to the server 30. Other now known or later developed requests may be communicated, such as an INVITE, YE, CANCEL, or REGISTER request.

SIP Responses may indicate whether the SIP Request succeeded or failed. If the SIP Request failed, the SIP Response may indicate why it failed. An SIP Response may be an Informational Response, Successful Response, Redirection Response, Client Failure Response, Server Failure Response, and Global Failure Response. For example, if the SIP Request was successful a SIP Response may include a Successful Response, such as SIP: 200 OK. Other now known or later developed requests and responses may be communicated. For example, local equivalents may be used.

An activation signal may be transmitted from the processor 21 to the server 30. The processor 21 may generate an activation signal when the customer device 20 is activated. Activation may include resetting, reprogramming, activating, triggering, or reconfiguring the customer device 20. Activation may occur when the customer begins waiting for the service, which may be referred to as the start time. For example, at a restaurant, if a customer requests a table, but there is a wait before being seated, a representative of the restaurant may activate a customer device 20 and give the customer device 20 to the customer. Before giving the customer device 20 to the customer, the enterprise representative may activate the customer device 20 and associate the device 20 with the customer. An activation signal may be used to begin a clock, such as a clock used to measure the length of wait before being served. The time when the clock begins measuring is the start time and may be stored for future analysis, such as determining the length of time that the customer waited before being served.

A termination signal may be transmitted from the processor 21 to the server 30. The processor 21 may generate a termination signal after the customer device 20 is deactivated, triggered, or receives input. Deactivation may include resetting, reprogramming, reconfiguring, or shutting down the customer device 20. The termination signal may be generated when the customer is served and/or seated. For example, the termination signal is triggered by turning off the customer device 20, docking the customer device 20, and/or by receiving user input on the customer device 20.

The termination signal may indicate the stop time. For example, at a restaurant, if a customer requests a table, but there is a wait before being seated, a representative of the restaurant may activate a customer device 20 and give the customer device 20 to the customer. Before giving the customer device 20 to the customer, the enterprise representative may activate the customer device 20 and associate the device 20 with the customer. When the customer is served or is about to be served, the enterprise representative may deactivate the customer device 20. This ends the actual wait time.

A performance measurement signal may be transmitted from the processor 21 to the server 30. The performance measurement signal may include information about how long a customer has been waiting or has waited. For example, the performance measurement signal may include information relating to actual wait time, current wait time, anticipated wait time, or other customer information. Customer information may include information relating to the customer or any other information relating to the customer's wait time or profile, such as the number of people associated with the customer device 20, the location of the customer device 20, the type of service the customer is waiting for, or service preference.

The processor 21 may deliver one or more request signals to the server 30. Request signals may include signals requesting information to be delivered to the customer device 20, such as current wait time information, anticipated wait time information, or customer information. For example, the processor 21 may request information from the server 30 regarding the anticipated wait time. In another example, the processor 21 may deliver performance measurement information to the server 30 and a request signal, requesting the current wait time based upon the delivered performance information.

The processor 21 may receive information from the server 30. The processor 21 may receive information such as current wait time information, anticipated wait time information, or customer information. For example, the processor 21 may receive anticipated wait time information from the server 30, which may be used to render the anticipated wait time information to the user via the display.

The processor 21 may receive an event notification signal from the server 30. An event notification signal includes information that may be used to notify the customer that the enterprise 12 is ready to serve the customer. Notification may include vibration, flashing lights, text message, audio sound, or other noticeable notification. For example, at a restaurant, when the enterprise is ready to serve the customer, an event notification signal may be transmitted to the customer device 12, which may be used to notify the customer that the table is ready.

The processor 21 communicates with the memory 22. For example, the processor 21 may read data stored in the memory 22. Alternatively, the processor 21 may transfer data to the memory 22 for storage.

The memory 22 and 32 are computer readable storage media. Computer readable storage media includes various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 22 and 32 may be a single device or a combination of devices. The memory 22 and 32 may be adjacent to, part of, networked with and/or remote from the processors 21 and 31.

The memory 22 may store customer data. Customer data may be data relating to the customer's profile or visit to the enterprise 12. For example, customer data may include data associated with or related to the amount of time the customer has been waiting to be served, the expected amount of time remaining before the client is served, the customer's evaluation of the enterprise (e.g., input using an input device), and/or performance measurements related to service wait times.

The display 23 is a device for presentation of information or tactile reception, acquired, stored, or transmitted in various forms. The display 23 may include CRTs, monitors, flat panels, LCDs, projectors, printers, or other now known or later developed display devices for outputting determined information. For example, the processors 21 or 31 cause the display device 23 at a local or remote location to output data indicating identification, information, notification, results, or other service related information.

The display 23 may be operated to display text, graphics, charts, documents, lights, or other presentations of information. For example, the processor 21 may display a text message on the display 23. The text message may relate to the current wait time or anticipated wait time.

The display 23 may operate to notify a customer that the enterprise 12 is ready to serve the customer. Notification may include audio, graphical, text-based, visual, or other now known or later developed notification. Based on an event notification signal, the processor 21 may use the display 23 to notify a customer that service is ready. For example, the processor 21 may display a light on the display 23 indicating that the enterprise 12 is ready to serve the client.

The server 30 may include a processor 31 and memory 32. Additional, different, or fewer components may be provided, such as a display or input device. The server 30 is a SIP server, application-layer control (signaling) protocol server, remote terminal server, central processing server, a combination thereof, or other now known or later developed server. For example, the server 30 is a SIP server that is remotely connected to one or more customer devices 20, such as SIP endpoints. The SIP server may communicate with the customer device 20 or SIP endpoints using SIP signaling. The SIP protocol is a higher level protocol that can be transported via the lower level protocols, such as a user datagram protocol (UDP), or transmission control protocol (TCP), or transparent LAN service (TLS). The UDP, TCP, TLS protocols can be transported via the lower level Internet Protocol (IP). The IP can be transported over various different physical mediums e.g. via a cable or wireless device.

The server 30 may communicate using an SIP protocol or other protocol. For example, the server 30 may communicate with the customer device 20, potential customer device 11, second server 40, or other communication device using an SIP protocol. The SIP protocol may be used to transport Extensible Markup Language (XML) documents within the body of a NOTIFY or PUBLISH request using standard SIP signaling. The XML document may include instructions or data.

The processor 31 is operative to receive, analyze, determine a wait time, transmit, organize, store, read, and/or display information. Additional, different, or fewer functions may be performed by the processor 31. For example, the processor 31 may transmit information to and/or receive information from a potential customer device 11 or other now known or later developed communication devices, such as a second server 40 (shown in FIGS. 5-6 and discussed below).

The processor 31 may receive signals from the customer device 20 or any other communication device, such as a second server 40 or potential client device 11. The processor 31 may receive activation signals, termination signals, performance measurement signals, customer data, and/or requests signals. Additional, different, or fewer signals, information, or data may be received. In one example, the processor 31 receives a request signal from the customer device 20 requesting information about current wait time or anticipated wait time.

The processor 31 may analyze information. Analysis may include analyzing activation signals, termination signals, performance measurement signals, customer data, requests signals, information stored in the memory 32, a combination thereof, or any information read or received by the processor 31. Analysis may include determining the actual wait time, current wait time, anticipated wait time, estimated wait time, and/or any combination thereof.

The processor 31 may determine the actual wait time. The actual wait time may be determined by measuring the length of time between activation and termination of the customer device 12. Other methods may be used to determine the actual wait time. For example, the actual wait time may be transmitted to the processor 31 from an input device or memory 32.

The processor 31 may determine the current wait time. The processor 31 may read a clock to determine the current wait time. For example, the processor 31 may compare a start time, which is the time that the customer began waiting, to the current time, which the processor 31 reads from a clock to determine the amount of time the customer has already waited. The amount of time the customer has waited may be transmitted to the customer device 20 and displayed on the display 23.

The processor 31 may determine the anticipated wait time. The anticipated wait time may be automatically calculated. The processor 31 may compare an estimated wait time to the current wait time to determine the anticipated wait time. For example, when the customer is given the customer device 20, an estimated wait time may be determined. The estimated wait time may be thirty (30) minutes. If the customer has already waited (current wait time) ten (10) minutes, the anticipated wait time is twenty (20) minutes (30 minus 10). The anticipated wait time may change as the estimated wait time changes. If the estimated wait time is periodically updated, the anticipated wait time may also be periodically updated and adjusted to reflect the new anticipated wait time.

The processor 31 may determine the estimated wait time. The estimated wait time may be automatically calculated. The estimated wait time is an approximation of the actual length of time a customer will wait before being served. The estimated wait time may be determined automatically, semi-automatically, or manually. For example, the processor 31 may automatically determine the estimated wait time using rules, guides, charts, or other information. In another example, an expert may determine the estimated wait time and transfer the estimated wait time to the processor 31 using an input device.

To determine the estimated wait time, the processor 31 may analyze information stored in the memory 32, received from one or more customer devices 20, or input from other devices. For example, the processor 31 may analyze the number of people waiting to be served that are in line before the customer and the average time that it takes to serve the enterprise's customers, which may be referred to as the average actual service time. The average actual service time may be determined using the actual wait time for other customers, which was collected using the customer devices 20. The actual wait times for previous customer's may be stored in the memory 32 and processed by the processor 31.

Other information may be used to determine the estimated wait time, such as analyzed information, stored information, customer information, enterprise 12 information, classifications, performance measurement information, requested information, or a combination thereof. For example, the estimated wait time may be determined using enterprise information, such as the number of tables in a restaurant, the number of riders allowed on an amusement ride, or the estimated length of time to serve customers at the enterprise 12. In another example, the estimated wait time may be based on the type of service the customer requested. At a restaurant, the estimated wait time may be longer for outdoor seating than the estimated wait time for indoor seating. At a ski resort, the estimated wait time for a chair lift may be longer than the estimated wait time for a gondola lift. Historical information may be used, such as the average wait time in the past given similar situations (e.g., number of people waiting and size of groups) and/or given similar timing (e.g., the wait time on Friday at 7:00 pm is longer than Wednesday at 8:00 pm).

The processor 31 may determine the estimated wait time for one or more classifications. A classification is a systematic arrangement in groups or categories according to established criteria. Classification may include identification. For example, "party of four people" is a classification. Other classifications may include the type of service (e.g., dining, hair cutting, amusement ride), customer type (e.g., man, woman, child), party size (e.g., 1, 2, . . . x), location (e.g., geographical location, outside seating, inside seating), or any other possible information.

An estimated wait time may be determined (e.g., calculated) periodically, continuously, upon the happening of an event, or a combination thereof. An estimated wait time may be determined automatically, semi-automatically, or manually. For example, an estimated wait times may be automatically determined each time a customer waiting for service is served. In another example, each time a customer in a classification is served, each estimated wait time in that classification may be automatically determined.

The estimated wait time for one or more classifications may be based on enterprise 12 information. For the classification "party of four," the processor 31 may analyze and associate the number of tables at the enterprise that are able to hold a party of four, the average service time for a party of four, and/or the number of other customers in line before the customer that have requested a table for four.

The processor 31 may cause storage of actual wait times, current wait times, anticipated wait times, estimated wait times, classifications, enterprise information, estimated wait times for classifications, any combination thereof; or any other information in a database. The database may be used to identify estimated wait times. For example, the database may be used to identify the estimated wait time for an amusement ride at a theme park. In another example, the database may be used to identify the estimated wait time for a "party of four."

The processor 31 may cause transmission of signals. Transmission may include transmitting analyzed information, current wait time information, anticipated wait time information, estimated wait time information, notification information, or any other information to the customer device 20, potential customer device 11, or any other communication device. Transmission may occur automatically or manually. Transmission may occur wirelessly, via a dedicated communication line, via a circuit, or any other now known or later developed communication technology. For example, the processor 31 may transmit signals to the processor 21 using SIP signaling over a wireless communication link.

The processor 31 may periodically or continuously transmit information to the customer device 20, potential customer device 11, or any other communication device. Transmission may be automatic, for example, without a request signal from the customer device 20 being received. Periodic transmission may occur every minute, every few minutes, every five minutes, or any time period set as a rule. Alternatively, the processor 31 may transmit information each time an event occurs, such as when the anticipated wait time is lengthened or shortened. The processor 31 may automatically transmit the estimated amount of time that a customer has to wait before being served. Alternatively, the processor 31 may only transmit information upon receiving a request signal from the customer device 20.

Figure 4:
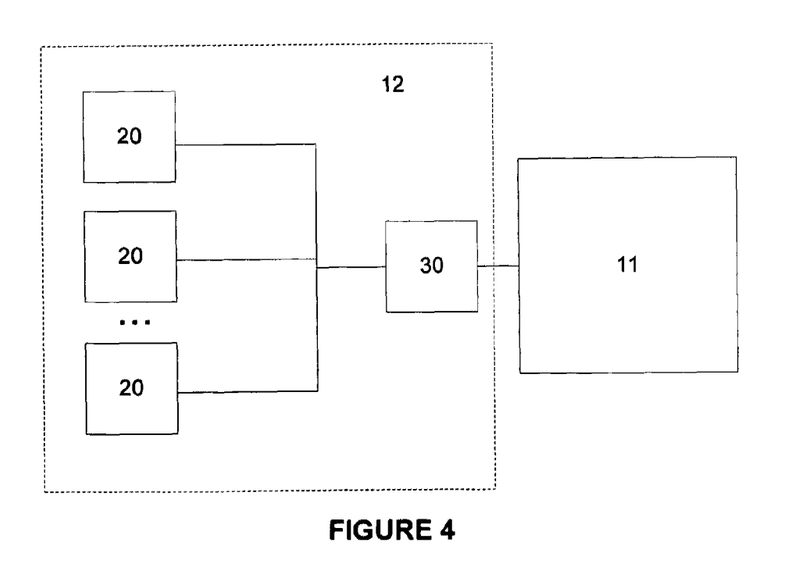
FIG. 4 illustrates one embodiment of a communication system.
Figure 5:
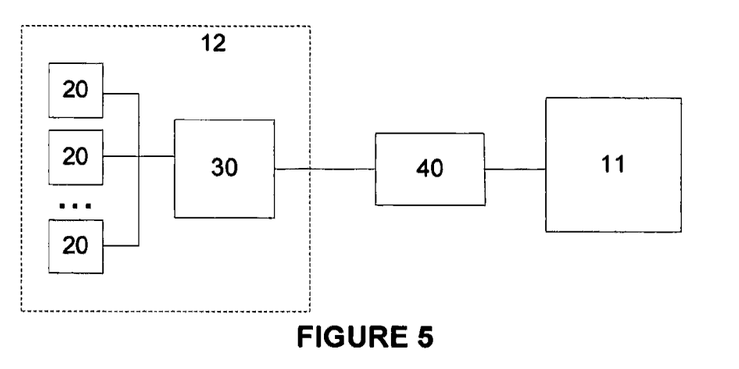
FIG. 5 illustrates another embodiment of a communication system.

The processor 31 may communicate with the potential customer device 11. Communication with the potential customer device 11 may include publishing, posting, sending, delivering, or transmitting information. For example, as shown in FIG. 4, the processor 31 may communicate directly with the potential customer device 11 by delivering a message directly to the potential customer device 11. Alternatively, the processor 31 may communicate indirectly with the potential customer device 11, for example, as shown in FIG. 5, by routing communication through a second server 40. Any communication system may be used to transmit communications from the processor 31 to the potential customer device 11 or vice versa.

Communication between the enterprise 12 and the potential customer device 11 may depend on the potential customer device 11. As discussed above, the potential customer device 11 may be a SIP client, SIP endpoint, SMS device, VoIP device, Internet browser, Intranet browser, WEB browser, remote terminal device, telecommunication device, handheld device, portable electronic device, personal computer, display device, a combination thereof, or any other now known or later developed device for communicating information to a potential customer.

In one embodiment, as shown in FIG. 4, the enterprise 12 may communicate directly with the potential customer device 11. For example, a potential customer device 11, such as a SIP endpoint, may communicate with the enterprise server 30, such as a SIP server, via SIP signaling. The potential customer device 11 may be used to retrieve the estimated wait time based on specific information, such as party size and table preference when the enterprise 11 is a restaurant. In another example, each customer waiting for a table at the restaurant may be given a customer device 20. Using information collected from the customer devices 20, the server 30 may determine an estimated wait time for a potential customer. The estimated wait time may be communicated to the potential customer device 11.

In one embodiment, as shown in FIG. 5, the enterprise 12 may communicate with the potential customer device 11 via a second server 40. The second server 40 is a WEB server, Internet Server, SIP Server, remote terminal server, or any other now known or later developed server. The second server 40 may be used to access or review information stored on the server 30, for example, in an estimated wait time database. For example, a WEB browser, VoIP device, electronic mailing device, SMS text device, or other server communication device may be used to communicate with the second server 40 and review information stored on the server 30.

The potential customer device 11 may communicate with a second server 40. For example, the potential customer device 11 may communicate with the second server 40 using any now known or later developed protocol, such as a transmission control protocol (TCP) or Internet Protocol (IP). The second server 40 may have access to the server 30 or wait time information about the enterprise 12. For example, a WEB browser may be used to communicate with the second server 40 to access or view information stored on or transmitted from the server 30. The estimated service wait times stored in or communicated from the server 30 may be transmitted to the second server 40. The estimated service wait times may be posted on one or more websites. For example, the enterprise 12 may manage, operate, or control a website accessible to WEB browsers using the second server 40. The estimated service wait times for the enterprise 12 may be posted or communicated to the enterprise's 12 website. Alternatively, the estimated service wait times may be posted on a website dedicated to providing estimated service wait times, for example, from one or more different enterprises. In another example, a VoIP device may be used to communicate with the second server 40 to access or view information stored on or transmitted from the server 30. In another example, an electronic mailing device may be used to communicate with the second server 40 to access or view information stored on or transmitted from the server 30. In another example, an SMS text messaging device may be used to communicate with the second server 40 to access or view information stored on or transmitted from the server 30.

Figure 6:
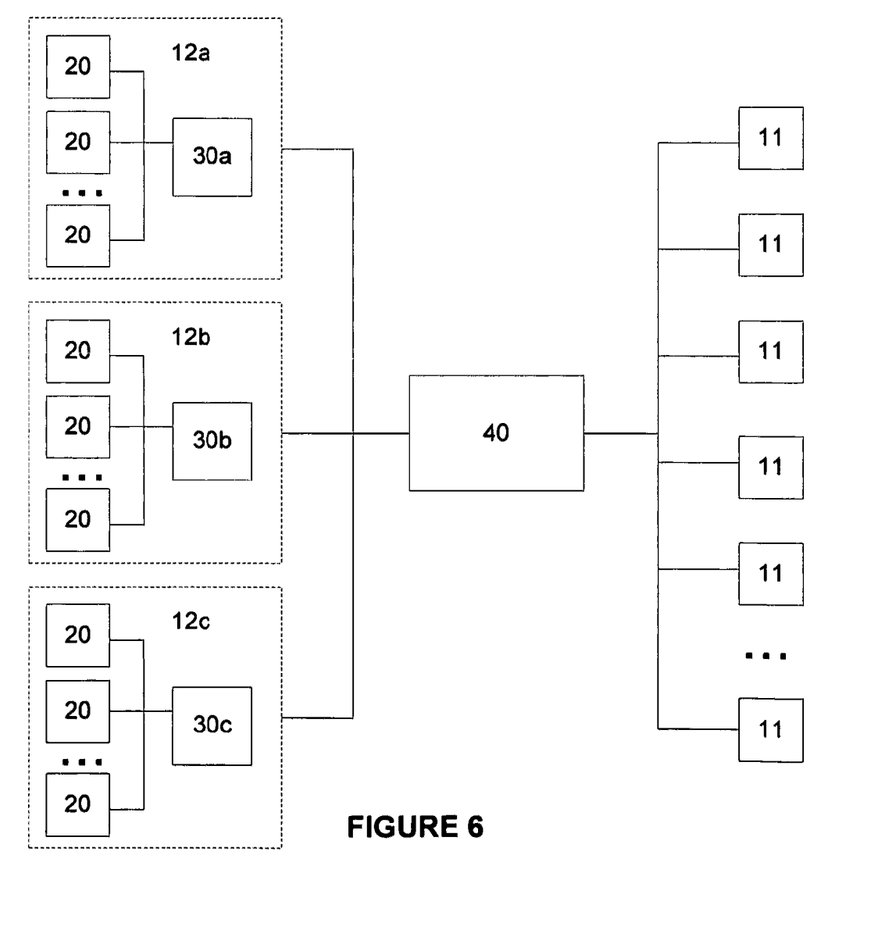
FIG. 6 illustrates yet another embodiment of a communication system.

In one embodiment, as shown in FIG. 6, a plurality of enterprises 12*a*, 12*b*, 12*c* may be connected to a second server 40. The enterprise 12*a* has a server 30*a* connected to the second server 40. Servers 30*b* and 30*c* are also connected to second server 40. For example, each enterprise 12*a*, 12*b*, 12*c* may be different restaurants having different locations. Each enterprise 12 may use customer devices 20 to collect actual wait times and determine the estimated wait time for each enterprise 12. The estimated wait times may be stored on the servers 30*a*, 30*b*, 30*c*. The servers 30*a*, 30*b*, 30*c* may be used to communicate the estimated wait times to one or more potential customer devices 11. In the example of FIG. 6, the servers 30*a*, 30*b*, 30*c* are connected to a second server 40, such as a WEB server, so that the estimated wait times may be posted on a website or different websites.

In one embodiment, a plurality of enterprises 12*a*, 12*b*, 12*c* may be connected to a single server 3.0, such as a SIP server, which is connected to the second server 40. Alternatively, one or more potential customers may communicate with the server 30 using a customer device 20, such as a SIP device to receive estimated service wait times.

The processor 31 may transmit information to the memory 32. The information may be organized information, performance measurement information, estimated wait time information, analyzed information, customer information and/or any other information. For example, the processor 31 may transmit information, which may be stored in an estimated wait time database, to the memory 32.

The memory 32 may store information. For example, the memory 32 may store an estimated wait time database. The estimated wait time database may include information received from one or more customer devices 20, information processed by the processor 31, information received from input devices, or any other information related to service wait time. The information in the estimated wait time database may be organized according to classifications or may be grouped according to search terms, such as those used when accessing the information via a website; The memory 32 may store any other information, including information not related to service wait time.

Figure 7:
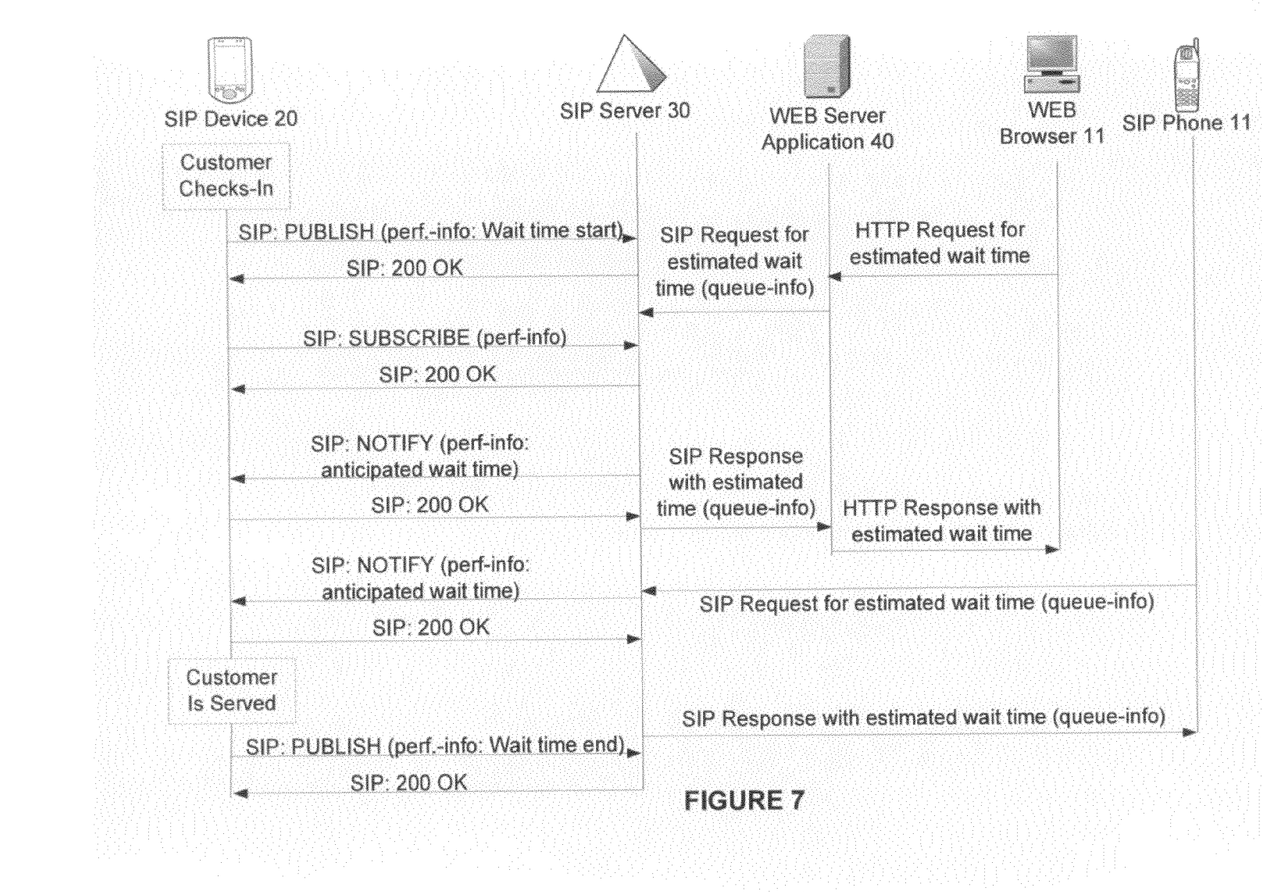
FIG. 7 illustrates yet another embodiment of a communication system.

FIG. 7 shows a system 10 for communicating service wait time information to a potential customer using a session initiation protocol (SIP) protocol. The SIP protocol may be used to transmit communications to and/or from the server 30 (such as the SIP Server 30 in FIG. 7). For example, the SIP server 30 may communicate directly with the customer device 20 (such as the SIP Device 20 in FIG. 7), the second server 40 (such as the WEB Server Application 40 in FIG. 7), and a potential customer device 11 (which is a SIP phone in FIG. 7) using an SIP protocol.

The SIP protocol is used to transport Extensible Markup Language (XML) documents within the body of a NOTIFY or PUBLISH message using standard SIP signaling. For example, the SIP Device 20 may pass a PUBLISH message to the SIP Server 30. The PUBLISH message may have an XML document that includes performance information, such as wait time start ("start time") information or wait time end ("stop time") information. The SIP Device 20 may also use SIP signaling to request anticipated wait time. For example, the SIP Device 20 may request the anticipated wait time using a SUBSCRIBE message. A SIP Response may be sent to indicate that the request was successful, for example, SIP: 200 OK. Using the SIP protocol, the SIP Server 30 may pass a NOTIFY message to the SIP Device 20. The NOTIFY message may have an XML document that includes performance information, such as anticipated wait time information. The SIP Server 30 may pass the NOTIFY message automatically. For example, the SIP Server 30 may pass the NOTIFY message without receiving a SUBSCRIBE message. The NOTIFY message may be automatically sent periodically.

The SIP protocol may be used to communicate directly with potential customer devices. 11 (such as the SIP Phone 11 in FIG. 7). The SIP Phone 11 may pass a SIP Request to the SIP Server 30 requesting an estimated wait time. The SIP server 30 may automatically calculate the estimated wait time. Using the SIP protocol, the SIP Server may send a SIP Response to the SIP phone 11 with the estimated wait time information.

The SIP protocol may be used to communicate indirectly with potential customer devices 11 (such as the WEB Browser 11 in FIG. 7). The Web Browser 11 may send an HTTP Request to the WEB Server Application 40 requesting estimated wait time information. The Web Server Application may process the HTTP Request and send a SIP Request to the SIP Server 30 requesting the estimated wait time. The SIP Server 30 may calculate the estimated wait time and send a SIP Response to the Web Server 40. The SIP Response may include the estimated wait time information. The Web Server 40 may then send an HTTP Response to the Web Browser 11 with the estimated wait time information.

Figure 8:
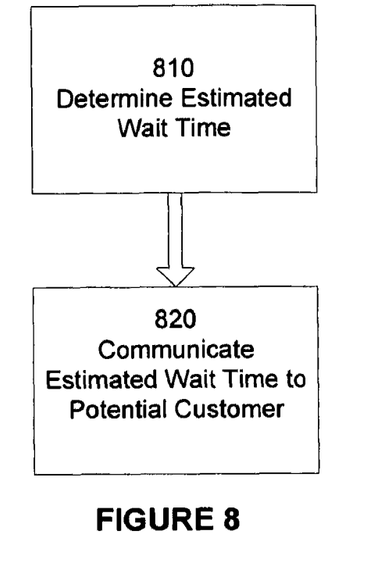
FIG. 8 illustrates a flowchart for communicating service information to a potential customer according to one embodiment.

FIG. 8 shows a method for communicating service information to a potential customer. The method is implemented using the system 10. Additional, different, or fewer acts than shown in FIG. 8 may be provided. For example, the method may include establishing a communication connection between a potential customer device and an enterprise. The acts may be performed in the order shown or a different order. The acts may be performed automatically, manually, or the combination thereof.

In act 810, an estimated service wait time is determined. The estimated service wait time may be determined automatically, manually, or a combination thereof. Determining an estimated service wait time may include collecting data from customer devices, averaging actual wait times for the enterprise or a classification, determining the estimated wait time using data stored in a memory, input by a user, or any combination thereof. Additional, different, or fewer acts may be performed. For example, any now known or later developed process for determining an estimated wait time may be performed in place of one or more of the acts or in combination with one acts.

Data may be collected from one or more customer devices. Customer devices may be used to collect the actual wait time for a service. For example, a restaurant may have a wait before being seated. The customer device may be used to track the length of time before a customer is seated. A clock may be used to determine the length of time a customer waits. The clock is started when the customer device is given to the customer or the customer's name is recorded in the restaurant's system. The clock is stopped when the customer returns the customer device and is seated. In another example, an amusement ride may have a wait before customers are able to ride on the amusement ride. A customer device may be used to track the time the customer waits in the amusement ride line. A customer device is given to a customer when entering the line and a clock is started. The clock is stopped when the customer gives the customer device back to the theme park, right before the customer is about to ride on the amusement ride. In alternative embodiments, the enterprise tracks the time, such as an employee using an enterprise device to track customer service time.

Determining the estimated wait time may include estimation, approximation, averaging, predictive guessing or other now known or later developed ways of providing a realistic estimation of a actual wait time the customer can expect to wait before being served. The estimated wait time may be determined using data collected from the customer devices, data stored in a memory, and/or data input from an input device. For example, determining the estimated wait time may include averaging the actual wait times for all or a part of the customer devices.

The estimated wait time may be determined using data stored in a memory. An actual wait time may be stored in memory. The actual wait time may be stored in a database. The estimated wait time may be stored in relation to other data. For example, in the case of a restaurant, the estimated service wait time for a party of four, on a Thursday evening at 6 pm may be related to one hour of wait time. This estimated wait time may be stored in memory and read to determine the estimated wait time.

The estimated wait time may be determined using data input from an input device. Estimated wait times may be input by experts or others estimating wait times. For example, a hostess at a restaurant may input the approximate wait time before being served at the restaurant. In another example, estimated wait times may be input by other systems. Imaging systems may be used to approximate the length of a waiting line and associate an estimated service wait time with the length of the line.

The estimated wait time may be determined for one or more classifications. Different classifications may have different estimated wait times. The estimated wait times for the different classifications may be used to provide estimated wait times for different customers. For example, estimated wait times may be determined for classifications relating to customer information, such as party size, type of service desired, arrival time, or other information relating to the customer. In another example, the estimated wait time for a classification may be determined by averaging the actual wait times in the classification. The estimation may be based on historical data and/or current data (e.g., wait times in the last hour).

The estimated wait time may be analyzed and/or adjusted. The estimated wait times may be analyzed. Analysis may include organizing, relating, classifying, grouping, processing, averaging, or combining estimated wait times. For example, the estimated wait times may be grouped by classification. In one example, in a restaurant, an estimated wait time for a table may be classified as "estimated wait time for a party of four." In another example, at a theme park, an estimated wait time for a ride may be classified as "estimated wait time for ride."

The estimated wait time may be adjusted. Adjustments may be made based on received information, such as customer data, performance information, and/or other service wait time related information. For example, at a restaurant, if five other customers are listed before the customer and one of the five customers is removed from the waiting list, the estimated service wait time may be adjusted to reflect the shorter waiting time. In another example, at a theme park, if ten people are in line for an amusement ride and twenty additional people arrive at the amusement ride and request a customer device, the estimated service wait time may be adjusted to reflect the extended waiting period. Adjustments to the estimated service wait time may be made using any information related to service wait time.

The estimated wait time may be updated periodically or continuously. The estimated wait time may be automatically or manually updated. For example, an estimated wait time for one or more classifications may be updated or adjusted every five (5) minutes, every time a request signal is received, or upon detection of an event, such as another customer is served.

In act 820, the estimated wait time is communicated to a potential customer device. Communication may include transferring, communicating, posting, SMS texting, telecommunicating, SIP signaling, or any other now known or later developed way of communicating the service wait time to a customer. For example, the potential customer may be operating an SIP device. The service wait time may be transmitted from an SIP server to the SIP device and displayed on the SIP device. An SIP system having an SIP server and SIP device are commonly used in the service industry. In another example, the customer may be operating an SMS text messaging device. The customer may request estimated wait time information, using an SMS text message. The request may be sent to an SMS configured server or other device operated by the enterprise. The request may be automatically or manually returned to the customer's SMS device with the estimated service wait time. In another example, an enterprise system may be connected to an Internet server. The service may post the estimated wait time on a website. The customer may view the estimated wait time using a WEB browser. Alternatively, a customer may email the enterprise an estimated wait time request. The estimated wait time may be automatically returned. Alternatively, a customer may use voice over Internet protocol (VoIP) device to receive the estimated wait time. Communication of the service wait time is not limited.

Figure 9:
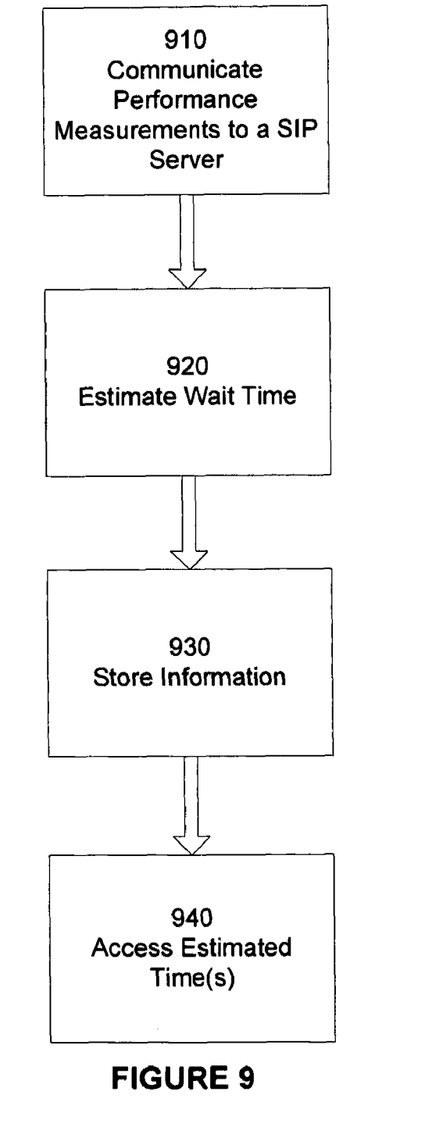
FIG. 9 illustrates another embodiment of a flowchart for communicating service information to a potential customer.

FIG. 9 shows a method for requesting and receiving an estimated wait time for a service using SIP signaling. The method is implemented using the system 10. Additional, different, or fewer acts than shown in FIG. 9 may be provided. For example, the method may include establishing a communication connection between a potential customer device and an enterprise. The acts may be performed in the order shown or a different order. The acts may be performed automatically, manually, or the combination thereof.

In act 910, performance measurements related to wait times are communicated to an SIP server. Communicating performance measurements may include uploading or delivering performance measurement information to a SIP server from an SIP client device. Performance measurements may include activation and termination signals. Other information, such as client profile information, may be communicated to the SIP server.

In act 920, an estimated wait time may be determined. Determining the estimated wait time may be performed using any now known or later developed methods, processes, or acts for estimating a wait time. Any information may be used to determine the estimated wait time. As discussed above, one example of determining the estimated wait time includes averaging the actual wait times for all customer devices used in the enterprise.

The estimated wait times, performance measurement information, and customer data may be stored in a database. The database may be classified or grouped according to information stored. The database may be used to identify the estimated wait times for one or more different classifications or groups. Each classification may be associated with other information.

In act 930, a potential customer accesses the information stored in database. Access may be direct or indirect. A potential customer may access the information using any now known or later developed method for retrieving or requesting information. For example, a potential customer may use a SIP client device, WEB browser, SMS text message device, VoIP device, or a telecommunication device.

In one embodiment, a potential customer may use a SIP client device to establish a session with the SIP server and access the database including the estimated wait times. For example, the SIP client device may transmit a request for estimated wait time to the SIP server. The SIP server may access the database and notify (respond to) the SIP client device of the estimated service wait time. The notification may be periodically sent to the SIP client device, such as at a defined time period or upon an event.

In one embodiment, a potential customer may use a WEB browser to retrieve information stored in the SIP server database. For example, the information stored in the SIP server database may be posted on a website that is accessible by the general public. The customer may navigate to the website and retrieve the desired information. The website may be interactive. For example, the customer may be able to request specific information, such as the wait time for a party of four or the wait time at a specific amusement ride at a theme park.

In one embodiment, a potential customer may use an SMS text messaging device to request an estimated wait time. An SMS text message may be automatically or manually returned to the customer's SMS device with the estimated wait time. The response may be automatic or manually transmitted. In one embodiment, a potential customer may use a VoIP device to request an estimated service wait time. A response may be sent to the VoIP device.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for communicating an estimated wait time to a potential customer, the method comprising:
  collecting data from a plurality of customer devices, the customer devices comprising a first customer device;
  a server determining actual wait time information based on the collected data for a specified enterprise;
  storing the actual wait time information in a non-transitory computer readable medium;
  the server determining current wait time information based on the collected data for the specified enterprise;

storing the current wait time information in the non-transitory computer readable medium according to a classification type;

determining at least one of:
(a) estimated wait time information based on the stored actual wait time information obtained from the customer devices, and
(b) anticipated wait time information based on the stored current wait time information obtained from the customer devices and the stored actual wait time information obtained from the customer devices;

transmitting at least one of the estimated wait time information and the anticipated wait time information to the first customer device or a communication device of the potential customer such that the at least one of the estimated wait time information and the anticipated wait time information is displayable at the first customer device or the communication device of the potential customer.

2. The method of claim 1 wherein the anticipated wait time information is also determined based upon a classification type, the classification type comprising information related to at least one of a party size, a type of service desired, arrival time, and customer input information and wherein the customer devices are communication devices used by at least one of customers and potential customers of the specified enterprise.

3. The method of claim 1 further comprising establishing a connection between each of the plurality of customer devices and the server, the server being an SIP server.

4. The method of claim 1 further comprising updating the estimated wait time information based on at least one of customer data information, performance information, and service wait time related information.

5. The method of claim 4 wherein the updating is performed periodically and wherein the period of updating is determined based on at least one of a receipt of a request signal and a detection of an event.

6. The method of claim 1 wherein the anticipated wait time information is transmitted to the first customer device, the anticipated wait time information being comprised of an anticipated wait time for the first customer device, the anticipated wait time for the first customer device being an amount of time that is equal to an estimated wait time of the estimated wait time information minus a current wait time of the first customer device, the current wait time of the first customer device being a portion of the stored current wait time information.

7. The method as claimed in claim 1, wherein transmitting the estimated wait time information comprises transmitting estimated wait time information from the server to the communication device of the potential customer using SIP signaling.

8. The method of claim 1 wherein the first customer device or the communication device of the potential customer displaying the at least one of the estimated wait time information and the anticipated wait time information by at least one of outputting a text message, outputting a graphics message, outputting a chart, outputting a document, and activating a light.

9. The method of claim 1 further comprising transmitting a notification signal to at least one of the first customer device and the communication device of the potential customer and causing an output regarding the notification signal at the first customer device or the communication device of the potential customer, wherein the output comprises at least one of a vibration of the first customer device or the communication device of the potential customer, activation of a light of the first customer device or the communication device of the potential customer, a text message displayed at the first customer device or the communication device of the potential customer, and an audio sound emitted from a speaker of the first customer device or the communication device of the potential customer.

10. The method of claim 1 further comprising determining the actual wait time information by measuring a length of time between activation and termination of each of the customer devices.

11. The method of claim 1 further comprising activating the first customer device, establishing a connection between the first customer device and the server, and the specified enterprise providing the first customer device to a customer or a potential customer of the specified enterprise.

12. The method of claim 11 further comprising the specified enterprise terminating the activation of the first customer device.

13. The method of claim 12 further comprising transmitting a time that the first customer device was activated and a time that the first customer device was terminated following the terminating of the activation of the first customer device.

14. A system for communicating service information to a potential customer, the system comprising:
a plurality of customer devices, the customer devices comprising a first customer device;
at least one server; and
wherein the at least one server collecting data from the plurality of customer devices;
wherein the at least one server determining actual wait time information based on the collected data for a specified enterprise;
wherein the at least one server determining current wait time information based on the collected data for the specified enterprise;
wherein the at least one server storing the actual wait time information in a non-transitory computer readable medium;
wherein the at least one server storing the current wait time information in the non-transitory computer readable medium;
wherein the at least one server determining at least one of:
(a) estimated wait time information based the stored actual wait time information obtained from the customer devices, and
(b) anticipated wait time information based the stored current wait time information obtained from the customer devices and the stored actual wait time information obtained from the customer devices; and
wherein the at least one server transmitting at least one of the estimated wait time information and the anticipated wait time information to at least one of the first customer device and a communication device of the potential customer.

15. The system of claim 14 wherein the plurality of customer devices are provided by the specified enterprise.

16. The system of claim 14 wherein the server transmits the estimated wait time information to the first customer device or the communication device of the potential customer via Session Initiation Protocol ("SIP").

17. The system of claim 14 wherein the server collects and stores data for multiple specified enterprises.

18. The system of claim 14 wherein the server only transmits the estimated wait time information to the communication device of the potential customer in response to a request sent from the communication device of the potential customer, the estimated wait time information comprising an estimated waiting time.

19. The system of claim 14 wherein the actual wait time information is determined by measuring a length of time between activation and termination of each customer device.

20. The system of claim 14 wherein the anticipated wait time information is transmitted to the first customer device, the anticipated wait time information being comprised of an anticipated wait time calculated by subtracting an estimated wait time of the estimated wait time information from a current wait time of the first customer device, the current wait time of the first customer device being a portion of the current wait time information.

21. A computer readable storage medium, the computer readable storage medium being non-transitory, the computer readable storage medium comprising instructions for communicating service information that are processable by a computer device, the instructions defining a method, the method comprising:
   collecting data from a plurality of customer devices, the customer devices comprising a first customer device;
   determining actual wait time information based on the collected data for a specified enterprise;
   storing the actual wait time information in a first non-transitory computer readable medium;
   determining current wait time information based on the collected data for the specified enterprise;
   storing the current wait time information in the first non-transitory computer readable medium according to a classification type;
   determining at least one of:
      (a) estimated wait time information based on the stored actual wait time information obtained from the customer devices, and
      (b) anticipated wait time information based on the stored current wait time information obtained from the customer devices and the stored actual wait time information obtained from the customer devices; and
   transmitting at least one of the estimated wait time information and the anticipated wait time information to the first customer device or a communication device of a potential customer.

22. The computer readable storage medium of claim 21 wherein the anticipated wait time information is transmitted to the first customer device, the anticipated wait time information being comprised of an anticipated wait time calculated by subtracting an estimated wait time of the estimated wait time information from a current wait time of the first customer device, the current wait time of the first customer device being a portion of the current wait time information.

23. The computer readable storage medium of claim 21 wherein the actual wait time information is determined by measuring a length of time between activation and termination of each customer device.

24. The computer readable storage medium of claim 21 wherein only the estimated wait time information is transmitted to the communication device of the potential customer and the estimated wait time information is transmitted in response to a request sent from the communication device of the potential customer, the estimated wait time information comprising an estimated waiting time.

25. The computer readable storage medium of claim 21 wherein the method comprises transferring the estimated wait time information to a second server.

26. The computer readable storage medium of claim 25 instructions as claimed in claim 15, wherein the second server is an Internet server.

* * * * *